(12) United States Patent
Ascher

(10) Patent No.: US 10,220,911 B2
(45) Date of Patent: Mar. 5, 2019

(54) DRIVE ASSEMBLY FOR A HUMAN-POWERED MACHINE

(71) Applicant: Steven Ascher, Greenbrae, CA (US)

(72) Inventor: Steven Ascher, Greenbrae, CA (US)

( * ) Notice: Subject to any disclaimer, the term of this patent is extended or adjusted under 35 U.S.C. 154(b) by 0 days.

(21) Appl. No.: 15/447,780

(22) Filed: Mar. 2, 2017

(65) Prior Publication Data

US 2017/0253294 A1 Sep. 7, 2017

Related U.S. Application Data

(60) Provisional application No. 62/303,157, filed on Mar. 3, 2016.

(51) Int. Cl.
*B62M 1/38* (2013.01)
*B62K 3/00* (2006.01)
*B62M 3/08* (2006.01)

(52) U.S. Cl.
CPC .............. *B62M 1/38* (2013.01); *B62K 3/002* (2013.01); *B62M 3/08* (2013.01)

(58) Field of Classification Search
CPC . B62M 1/38; B62M 3/08; B62M 1/36; B62M 1/26; B62M 1/30; B62K 3/002
See application file for complete search history.

(56) References Cited

U.S. PATENT DOCUMENTS

| 2,466,105 A | * | 4/1949 | Hoffman | B62K 3/002 280/221 |
| 4,621,827 A | * | 11/1986 | Klein | B62K 19/06 280/274 |
| 4,986,556 A | | 1/1991 | Hartmann | |
| 5,242,343 A | | 9/1993 | Miller | |
| 5,518,473 A | | 5/1996 | Miller | |
| 5,527,246 A | | 6/1996 | Rodgers, Jr. | |
| 5,630,774 A | * | 5/1997 | Geschwender | B62K 3/002 280/267 |
| 5,685,804 A | | 11/1997 | Whan-Tong et al. | |
| 6,659,486 B2 | * | 12/2003 | Eschenbach | B62K 3/002 280/221 |
| 8,061,728 B2 | | 11/2011 | Teal et al. | |

(Continued)

OTHER PUBLICATIONS

U.S. Receiving Office, International Search Report in International Application No. PCT/US2017/020381, dated May 15, 2017, 2 pages.

(Continued)

*Primary Examiner* — Joseph M Rocca
*Assistant Examiner* — Michael R Stabley
(74) *Attorney, Agent, or Firm* — Kolitch Romano LLP

(57) ABSTRACT

A drive assembly for a human-powered machine may include a front crankset spaced from a rear crankset, each rotatably coupled to a frame. Crank arms of the rear crankset are longer than crank arms of the front crankset. A left foot platform and a right foot platform each have a rear portion rotatably coupled to a distal end portion of the corresponding rear crank arm, and a front portion in sliding and rotating engagement with a distal end portion of the corresponding front crank arm. The front crankset and the rear crankset may be mechanically coupled to each other, such that the two cranksets turn together at the same rotational speed in terms of RPM. The two cranksets may also be operatively connected to the hub of a wheel.

22 Claims, 13 Drawing Sheets

(56) References Cited

U.S. PATENT DOCUMENTS

| | | | |
|---|---|---|---|
| 8,210,553 B2* | 7/2012 | Fan | B62M 1/26 |
| | | | 280/221 |
| 9,139,252 B2* | 9/2015 | Scolari | B62M 3/08 |
| 9,475,543 B1* | 10/2016 | Chou | B62M 1/26 |
| 9,527,547 B2 | 12/2016 | Thomas et al. | |
| 2003/0030245 A1 | 2/2003 | Janssen | |
| 2003/0047902 A1 | 3/2003 | Miller | |
| 2005/0263978 A1 | 12/2005 | Ascher | |
| 2008/0116655 A1 | 5/2008 | Pate et al. | |
| 2009/0272225 A1* | 11/2009 | Wells, Jr. | B62M 3/04 |
| | | | 74/665 GE |
| 2012/0013097 A1 | 1/2012 | Fan | |
| 2014/0265218 A1 | 9/2014 | Scolari | |
| 2016/0046351 A1 | 2/2016 | Thomas et al. | |

OTHER PUBLICATIONS

U.S. Receiving Office, Written Opinion of the International Searching Authority in International Application No. PCT/US2017/020381, dated May 15, 2017, 5 pages.

\* cited by examiner

DRIVE ASSEMBLY FOR A HUMAN-POWERED MACHINE

CROSS-REFERENCES

This application claims the benefit under 35 U.S.C. § 119(e) of the priority of U.S. Provisional Patent Application Ser. No. 62/303,157, filed Mar. 3, 2016, the entirety of which is hereby incorporated by reference for all purposes.

INTRODUCTION

Two of the most popular forms of aerobic exercise and recreation are running and cycling. Running is a natural form of weight-bearing exercise, but the sustained impact of running often results in injury. Cycling provides a lower-impact, lower-weight bearing form of exercise, and is an efficient mode of human-powered transportation. Many cyclists, however, experience discomfort or injury from sustained saddle pressure, knee stress, or from the non-natural bent posture while cycling.

In general, stationary and mobile exercise machines having an elliptical drive assembly can provide low-impact, upright-posture exercise and recreation. However, such devices often have an inclined elliptical stepping motion that places concentrated stress on knees. This motion is also not as fluid as the natural teardrop-motion of a running stride. Furthermore, the long foot links and guides normally required by known elliptical systems result in large, heavy mechanisms. The foot platform and, accordingly, the rider's weight, is suspended between the two ends of the foot links. The guides of such known devices have a length approximately equal to the diameter of the circular motion provided by the single crank assembly. These guides protrude forward beyond the motion of the feet. Known mobile vehicles comprising variations of the elliptical mechanism also result in heavy, cumbersome vehicles having long wheelbases, small wheels, and/or short strides.

A need therefore exists for an apparatus that can provide aerobic exercise and recreation, while blending the more natural upright, fluid, teardrop motion and weight-bearing aspects of running with the low-impact, high efficiency of cycling. It is further desirable that such an apparatus be easy to use, compact, and of simpler, lower-cost construction.

SUMMARY

Addressing the problems and needs described above, an apparatus and drive assembly are disclosed herein that provide a smooth, natural, weight-bearing, teardrop motion similar to running, together with low-impact, compact efficiency similar to a bicycle.

In some embodiments, a drive assembly for a human-powered machine may include: a first crankset rotatably coupled to a frame, the first crankset including a pair of first crank arms each having a first length; a second crankset rotatably coupled to the frame and spaced rearward from the first crankset, the second crankset including a pair of second crank arms each having a second length longer than the first length; and a left foot platform and a right foot platform, each of the foot platforms having a rear portion rotatably coupled to a distal end portion of a respective one of the second crank arms and a front portion in sliding and rotating engagement with a distal end portion of a respective one of the first crank arms; wherein the first crankset and the second crankset are mechanically coupled to each other, such that the first and second cranksets turn together at a same revolutions per minute (RPM), and wherein the first and second cranksets are operatively connected to a hub of a wheel.

In some embodiments, a drive assembly for turning a human-powered wheel may include: a front crankset coupled to a rear crankset by a mechanical linkage, such that the front and rear cranksets turn together at a same RPM, wherein the front crankset includes a left front and a right front crank arm each having a first length and the rear crankset includes a left rear and a right rear crank arm each having a second length greater than the first length; a left foot platform connecting the left front crank arm to the left rear crank arm, a front portion of the left foot platform coupled to a distal end portion of the left front crank arm by a first pin-in-slot joint, and a rear portion of the left foot platform coupled to a distal end portion of the left rear crank arm by a first rotating joint; a right foot platform connecting the right front crank arm to the right rear crank arm, a front portion of the right foot platform coupled to a distal end portion of the right front crank arm by a second pin-in-slot joint, and a rear portion of the right foot platform coupled to a distal end portion of the right rear crank arm using a second rotating joint; and a wheel having a hub coupled to the front crankset such that power generated by the front and rear cranksets is transmitted to the wheel.

In some embodiments, a method for powering a machine may include: simultaneously rotating a front rotatable member and a rear rotatable member using a foot platform interconnecting distal ends of the front and rear rotatable members, each of the rotatable members being coupled to a frame of a foot-powered machine; wherein the front rotatable member is substantially shorter than the rear rotatable member, and a foot-supporting portion of the foot platform travels through a path having the shape of an oval when viewed orthogonally to a plane generally defined by the path, the oval having a larger end rearward and a smaller end forward.

In some embodiments, a method for turning a human-powered wheel may include: transmitting power from a pair of cranksets to a wheel, wherein a front crankset of the pair of cranksets includes a pair of front crank arms each having a first length and a rear crankset of the pair of cranksets includes a pair of rear crank arms each having a second length greater than the first length; wherein the front crankset is disposed a fixed distance forward of the rear crankset, and each one of the front crank arms is coupled to a corresponding one of the rear crank arms by a respective foot platform configured to receive a corresponding foot of a rider, wherein each foot platform is connected to a distal end portion of the respective front crank arm by a pin-in-slot joint and to a distal end portion of the respective rear crank arm by a rotating joint.

Features, functions, and advantages may be achieved independently in various embodiments of the present disclosure, or may be combined in yet other embodiments, further details of which can be seen with reference to the following description and drawings.

DESCRIPTION

Figure 1:
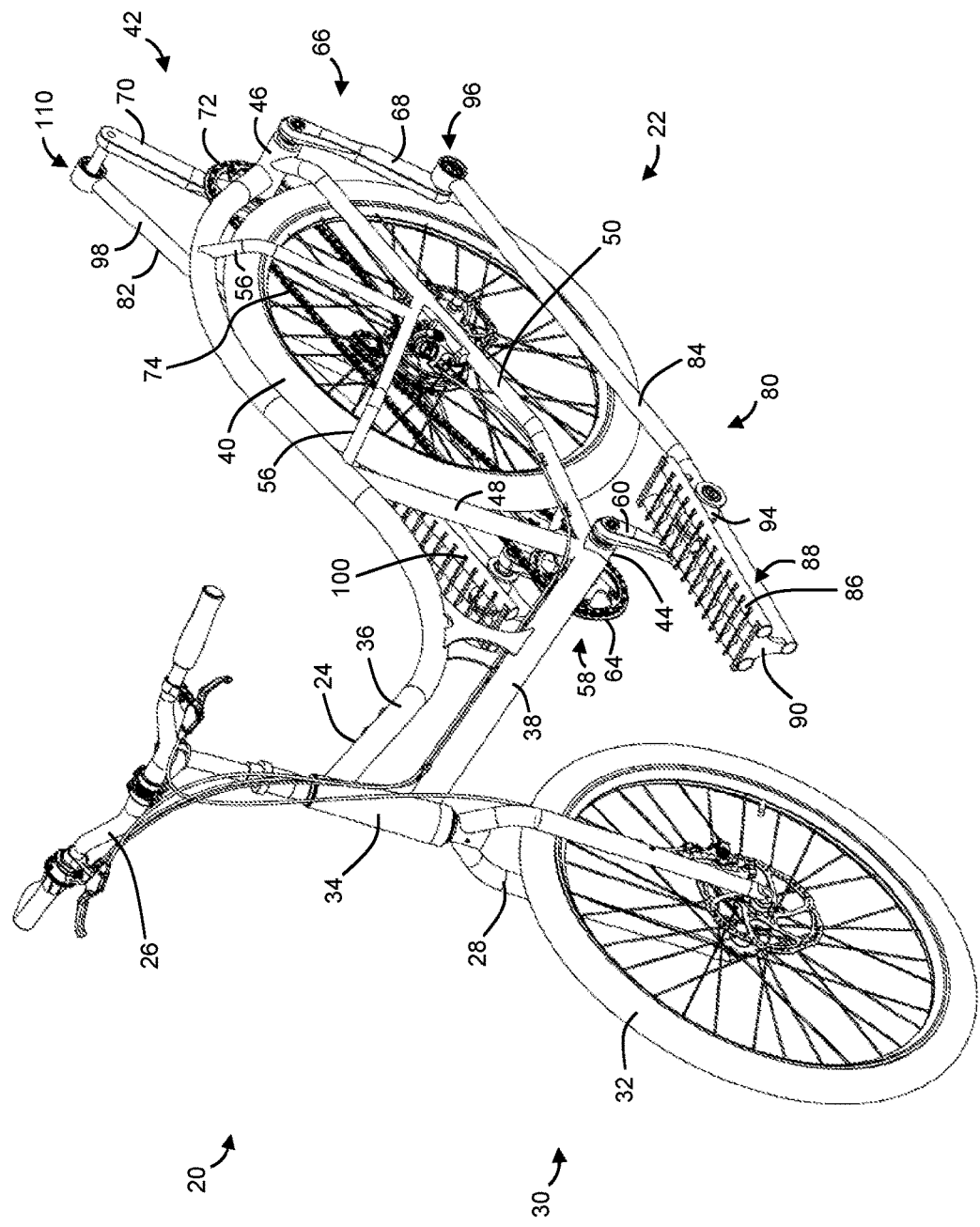
FIG. 1 is an isometric view of an illustrative human-powered vehicle having a drive assembly in accordance with aspects of the present disclosure.

Various aspects and examples of a drive assembly for human-powered (e.g., foot-powered) machines that takes advantage of a natural human running motion, as well as related apparatuses and methods, are described below and illustrated in the associated drawings. Unless otherwise specified, a drive assembly according to the present disclosure, and/or its various components, may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "left," "right," "forward," and "rearward" (and the like) are intended to be understood in the context of a host vehicle or machine into which systems described herein may be integrated or otherwise attached. For example, if the host vehicle is a bicycle, then a natural set of forward/rearward, up/down, left/right directions can be established based on the standard orientation of a rider. Similarly, terms such as "outboard" may indicate a relative position that is laterally farther from the centerline of the vehicle, or a direction that is away from the vehicle centerline. Conversely, "inboard" may indicate a direction toward the centerline, or a relative position that is closer to the centerline. In the absence of a host vehicle or machine, the same directional terms may be used as if the vehicle or machine were present. For example, even when viewed in isolation, a drive assembly may have a "front" crankset and a "rear" crankset, based on the fact that the components in question would be installed in that orientation with respect to the human powering the host machine.

The term "teardrop," as used herein, refers to an oval shape having one end larger than the other, i.e., having a larger end and a smaller end. In general, a teardrop will have a single axis of symmetry.

Overview

In general, a foot-powered drive assembly for human-powered machines, as described herein, facilitates the powering of such devices using a more natural running motion than seen in existing pedal-powered or elliptical-tread-powered drive trains. Furthermore, stationary and mobile exercise devices utilizing the drive assemblies disclosed herein can be more compact, lighter, and more efficient than existing elliptical devices.

As shown in the drawings and described in further detail below, drive assemblies according to the present teachings may include a front crankset and a rear crankset, both of which are rotatably coupled to a frame. Crank arms of the rear crankset are longer than crank arms of the front crankset. Left and right foot platforms each have a rear portion rotatably coupled to a distal end of the corresponding rear crank arm and a front portion in sliding and rotating engagement with a distal end of the corresponding front crank arm. The front crankset and the rear crankset are mechanically coupled to each other (e.g., by a bicycle chain), such that they turn together at the same revolutions per minute (RPM) (e.g., at the same overall rotational speed), and both cranksets are operatively connected to the hub of a wheel.

This arrangement generally creates a teardrop-like oval foot path and reduces the overall size of the drive assembly as compared to known elliptical drives. The generally longer rear crank arms determine a length of the teardrop stride. The forward crank arm length and separation distance between cranksets determines a shape of the teardrop. Rollers at the ends of the front crankset dynamically support the foot platforms via guide channels located directly under the rider's feet, providing robust foot support and efficient transfer of biomechanical energy. Unlike known elliptical drive trains, the forward axis of rotation does not extend beyond the motion of the feet. The resulting assembly is more compact, generally lighter, and more biomechanically efficient than known elliptical drives.

Examples, Components, and Alternatives

The following sections describe selected aspects of illustrative drive assemblies, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

Illustrative Vehicle and Drive Assembly

As shown in FIGS. 1 through 10, this section describes an illustrative human-powered vehicle 20 having an illustrative drive assembly 22. Drive assembly 22, and other drive assemblies described below, are examples of the drive assembly described in the Overview section above.

Figure 2:
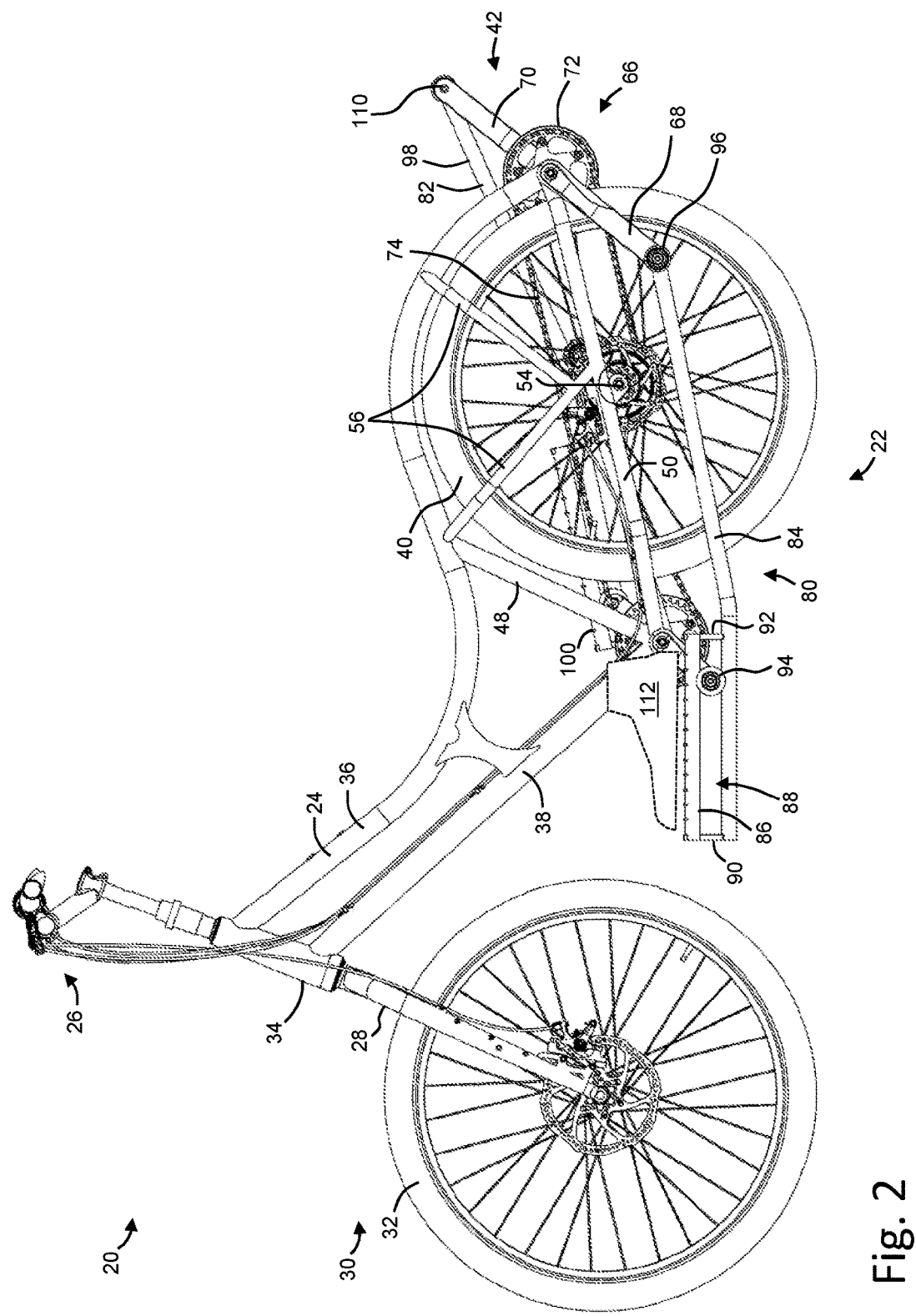
FIG. 2 is a left side elevation view of the vehicle and drive assembly of FIG. 1.
Figure 3:
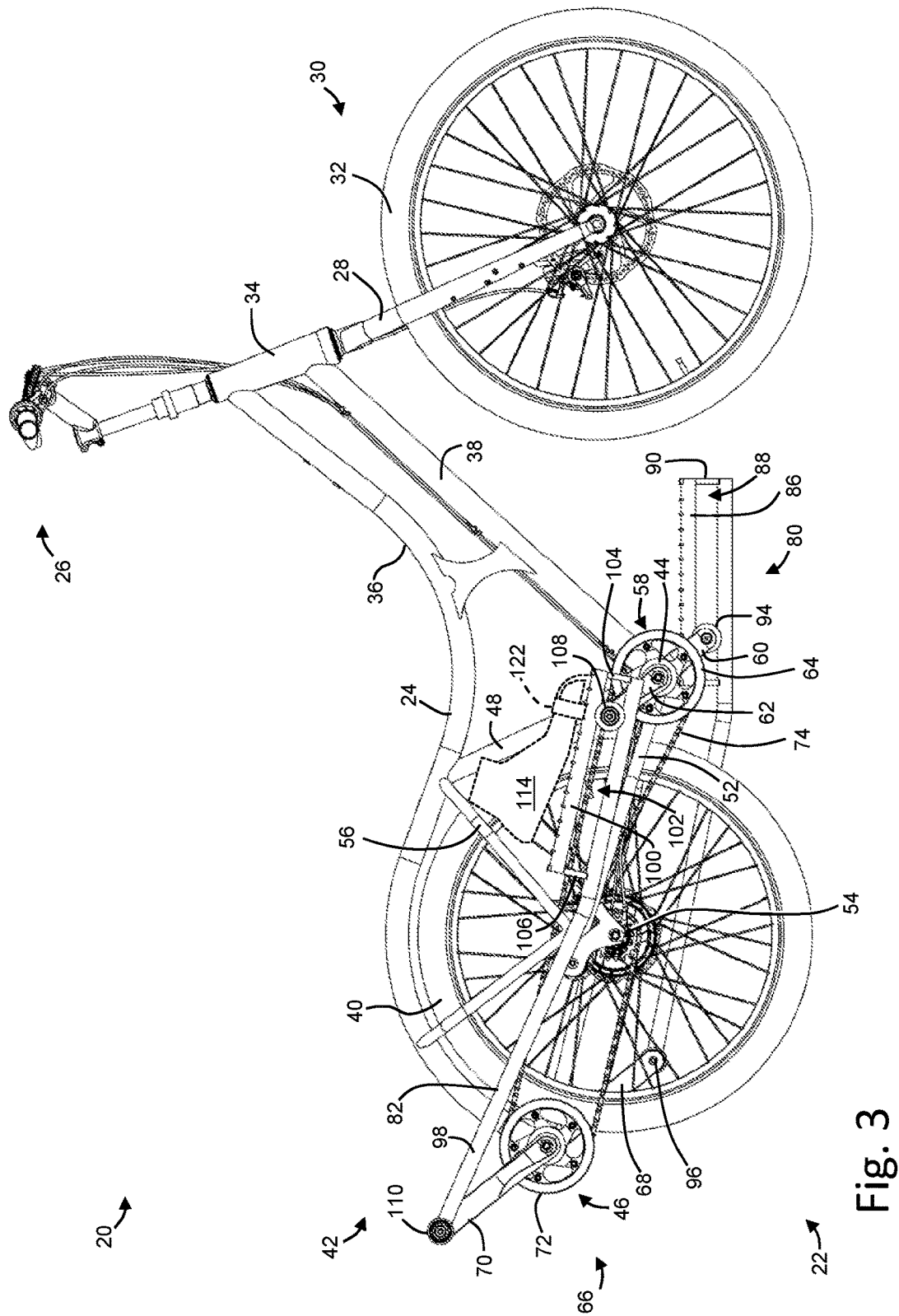
FIG. 3 is a right side elevation view of the vehicle and drive assembly of FIG. 1.
Figure 4:
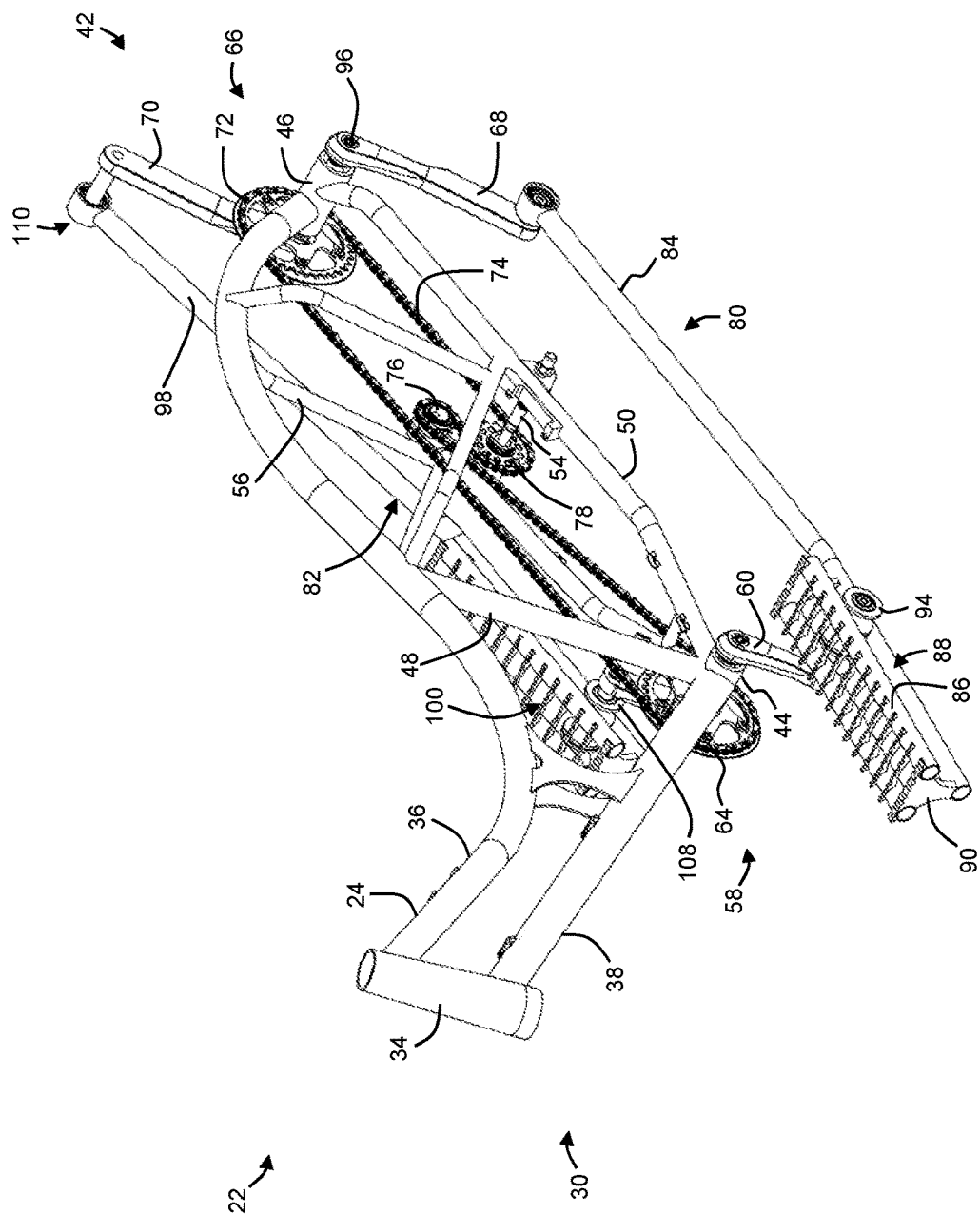
FIG. 4 is an isometric view of frame and drive assembly portions of the vehicle and drive assembly of FIG. 1.
Figure 5:
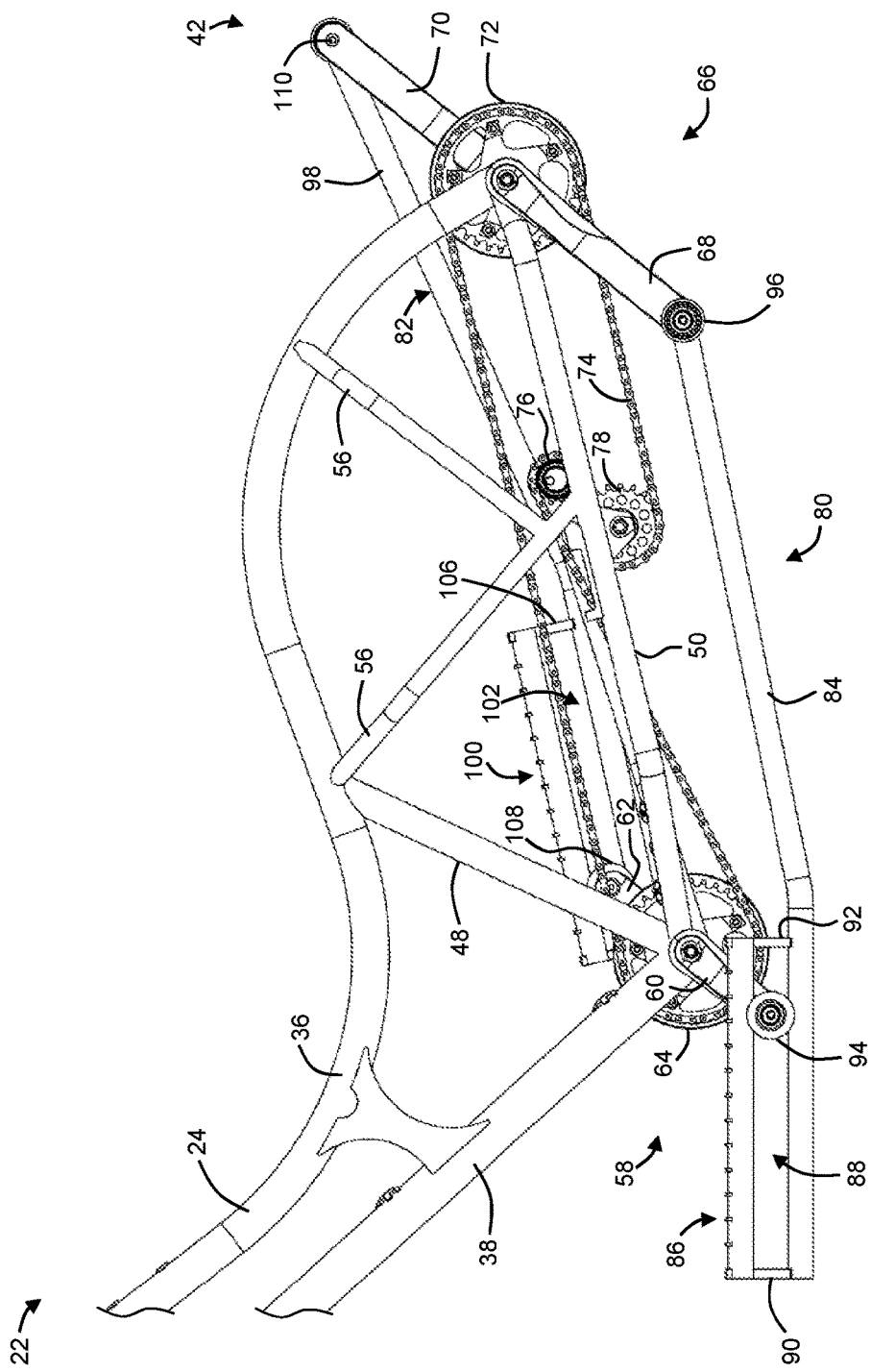
FIG. 5 is a partial left side elevation view of the frame and drive assembly shown in FIG. 4.

FIGS. 1 through 3 depict vehicle 20 and drive assembly 22, while FIGS. 4 through 10 depict drive assembly 22 in a more isolated fashion, to facilitate description and ease of understanding. Furthermore, drive assembly 22 may be utilized with any suitable machine (e.g., mobile bicycle, stationary exercise machine, foot-powered washing machine, etc.), and is not limited to the vehicle shown.

With reference to FIGS. 1-3, vehicle 20 includes a frame 24 having a handlebar 26 and steerable fork 28 at a front end 30. Handlebar 26 controls the direction of a front wheel 32 coupled to fork 28, by pivoting fork 28 via a head tube 34. In this example, frame 24 includes a top tube 36 and a down tube 38 extending generally rearward from the head tube. Vehicle 20 is a stand-up style of human-powered vehicle. Accordingly, there is no seat, and top tube 36 extends over a rear wheel 40 to a rear end 42 of the vehicle.

Down tube 38 terminates, at its lower end, at a front bottom bracket 44 (which may be abbreviated as front BB). Top tube 36 ends, at its rear end, at a rear bottom bracket 46 (also referred to as the rear BB). Frame 24 may include additional frame members, such as a tube member 48 from front BB 44 to top tube 36, a side stay 50 connecting the front BB to the rear BB on the left side of the frame, a chainstay 52 connecting the front BB to a hub 54 of rear wheel 40 on the right side of the frame, and one or more top tube stays 56.

With continued reference to FIGS. 1-10, and with specific reference to FIGS. 4-10, drive assembly 22 will now be described in further detail. As described above, drive assembly 22 includes a front crankset spaced from a longer rear crankset, both coupled to frame 24, and a pair of rider-engageable foot platforms configured to turn the cranksets.

Specifically, front bottom bracket 44 facilitates the rotatable coupling of a front crankset 58 to frame 24. Crankset 58 (also referred to as a first crankset) may include any suitable set of opposing crank arms configured to rotate a coaxial chainring or other sprocket or gear. In this example, front crankset 58 includes a left front crank arm 60 and a right front crank arm 62 coupled to a front chainring 64. Each of the front crank arms 60, 62 has the same first length.

Similarly, rear bottom bracket 46 facilitates the rotatable coupling of a rear crankset 66 to frame 24. Crankset 66 (also referred to as a second crankset) may include any suitable set of opposing crank arms configured to rotate a coaxial chainring or other sprocket or gear. In this example, rear crankset 66 includes a left rear crank arm 68 and a right rear crank arm 70 coupled to a rear chainring 72. Each of the rear crank arms 68, 70 has the same second length, which is substantially longer than the first length.

Crankset 58 may be coupled to crankset 66 by a mechanical linkage, such that the front and rear cranksets turn together at the same RPM (e.g., the same overall rotational speed). This mechanical linkage may include any suitable connector, including a flexible linkage such as a continuous loop of bicycle chain or synchronous belt. For example, as shown throughout the drawings, the mechanical linkage may comprise a chain 74 looped around and engaging both front chainring 64 and rear chainring 72, thereby coupling the two chainrings together. In this example, chain 74 also loops around and engages an idler pulley 76 (coupled to frame 24) and a sprocket 78 of hub 54 of rear wheel 40. Accordingly, chain 74 is a single bicycle chain passing around the first chainring, the second chainring, and the sprocket of the hub.

Figure 6:
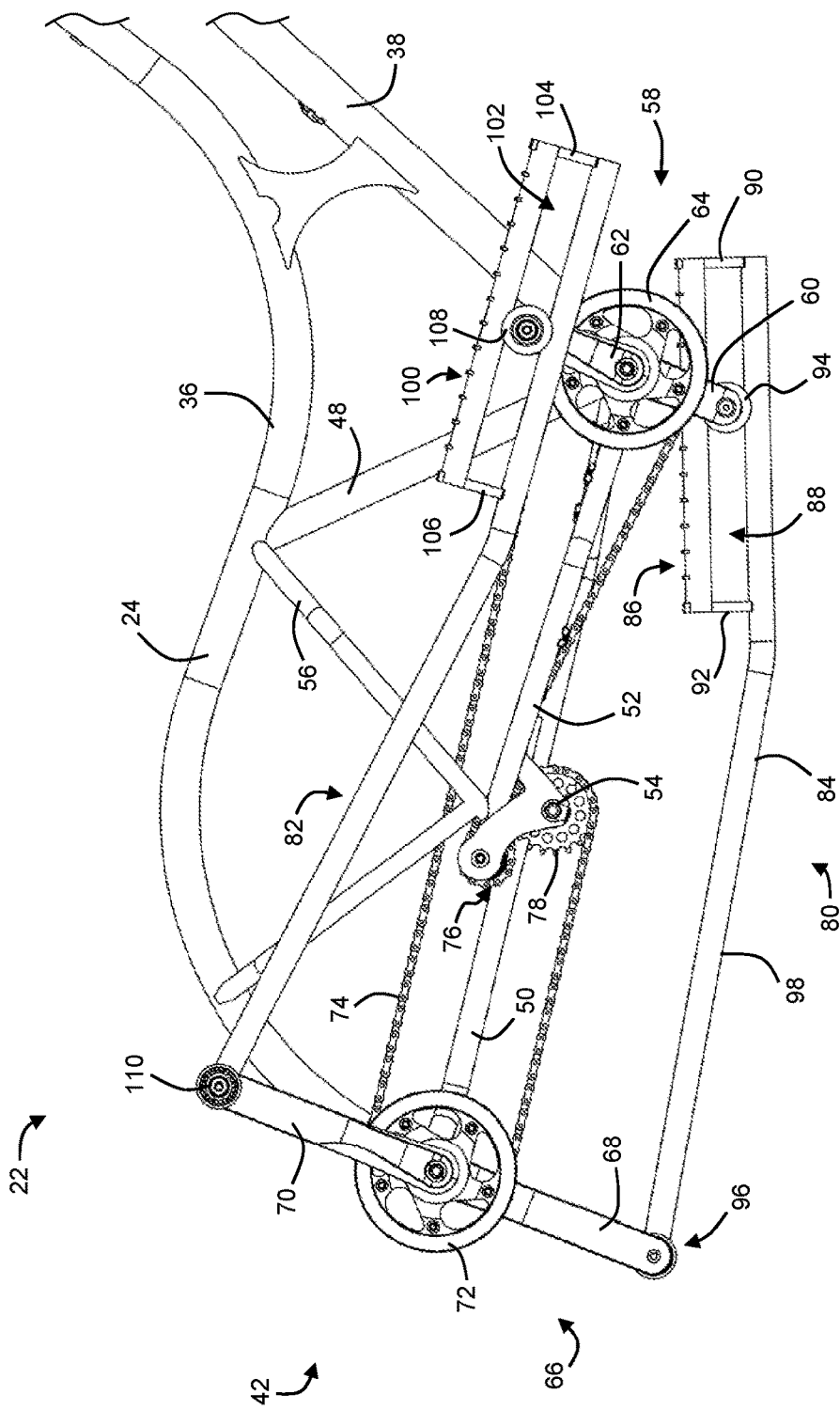
FIG. 6 is a partial right side elevation view of the frame and drive assembly shown in FIG. 4.

Idler pulley 76 may include any suitable device configured to adjustably take up slack in chain 74 and/or reposition the chain path such that more teeth of the hub sprocket are engaged. For example, as best shown in FIG. 6, idler pulley 76 may comprise an eccentric idler pulley mounted above and behind the hub sprocket. Idler pulley 76 has a mounting axis that is offset relative to the pulley's axis of rotation. The chain may be tightened or loosened by altering the angle of the pulley to place the pulley's axis of rotation closer or farther from the hub sprocket.

Sprocket 78 of hub 54 may include any suitable sprocket or sprockets configured to convert chain motion into torque for the purpose of rotating rear wheel 40. Sprocket 78 may comprise a multi-sprocket cassette. In some examples, sprocket 78 may be a single sprocket. In single-sprocket examples, the hub may be a single-speed hub, or may include an internal-gear hub to facilitate multiple speeds or gear ratios.

Drive assembly 22 also includes a left foot platform 80 and a right foot platform 82 connecting distal end portions of the respective front and rear crank arms. The foot platforms are configured to support the weight of a rider standing with one foot on each platform, and to enable the rider to rotate the front and rear cranksets simultaneously using a running-like motion. Each of the foot platforms has a rear portion rotatably coupled to the distal end portion of a respective one of the rear crank arms and a front portion in sliding and rotating engagement with the distal end portion of a respective one of the front crank arms.

Specifically, left foot platform 80 includes an elongate member 84 and a left foot support 86 at a front end of member 84. Left foot support 86 is spaced from member 84 to create a slot or channel 88, also referred to as the left roller channel. Forward and aft spacer members 90, 92 space the foot support from the elongate member, and create a close-ended channel 88 (also referred to as a closed slot).

Figure 7:
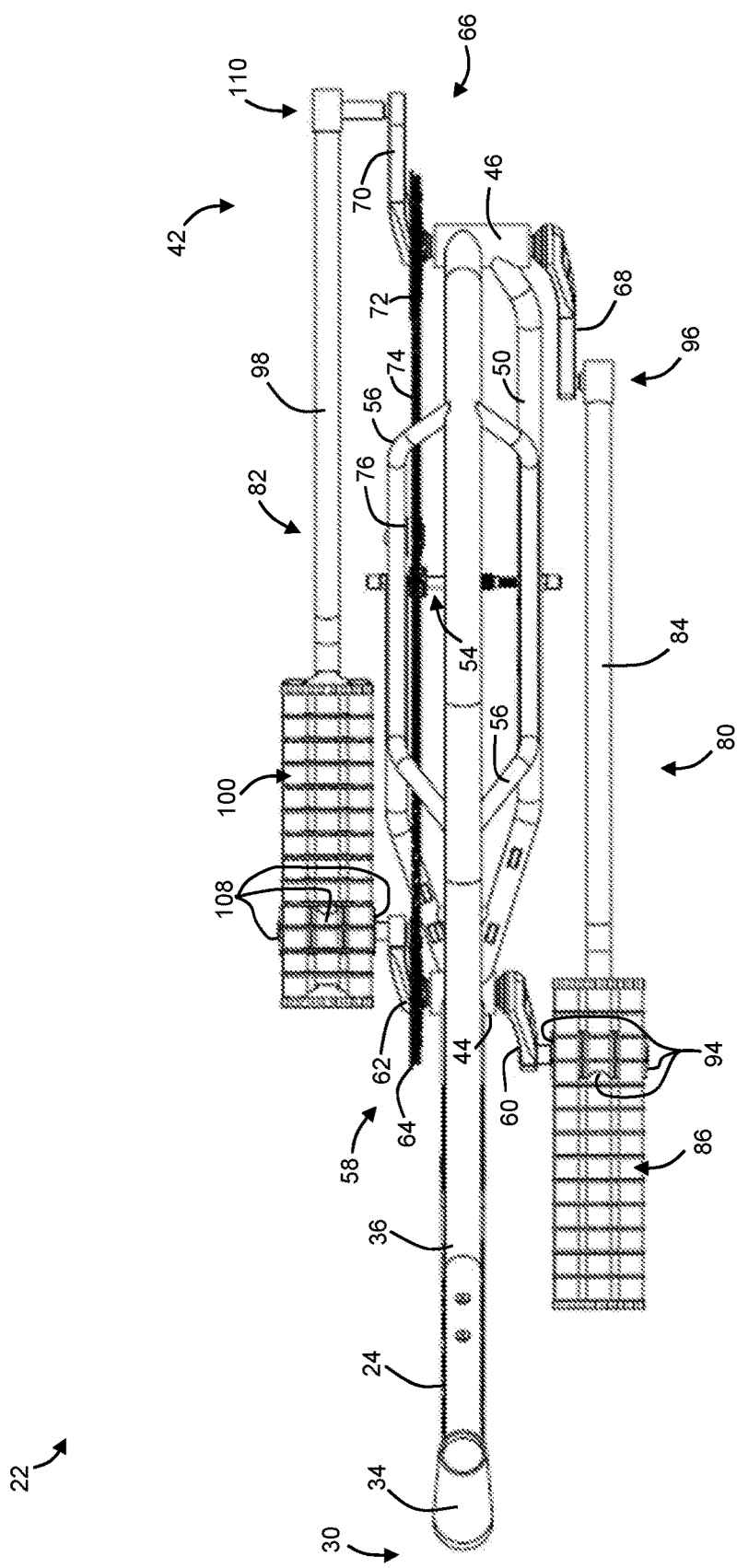
FIG. 7 is an overhead plan view of the frame and drive assembly shown in FIG. 4.
Figure 8:
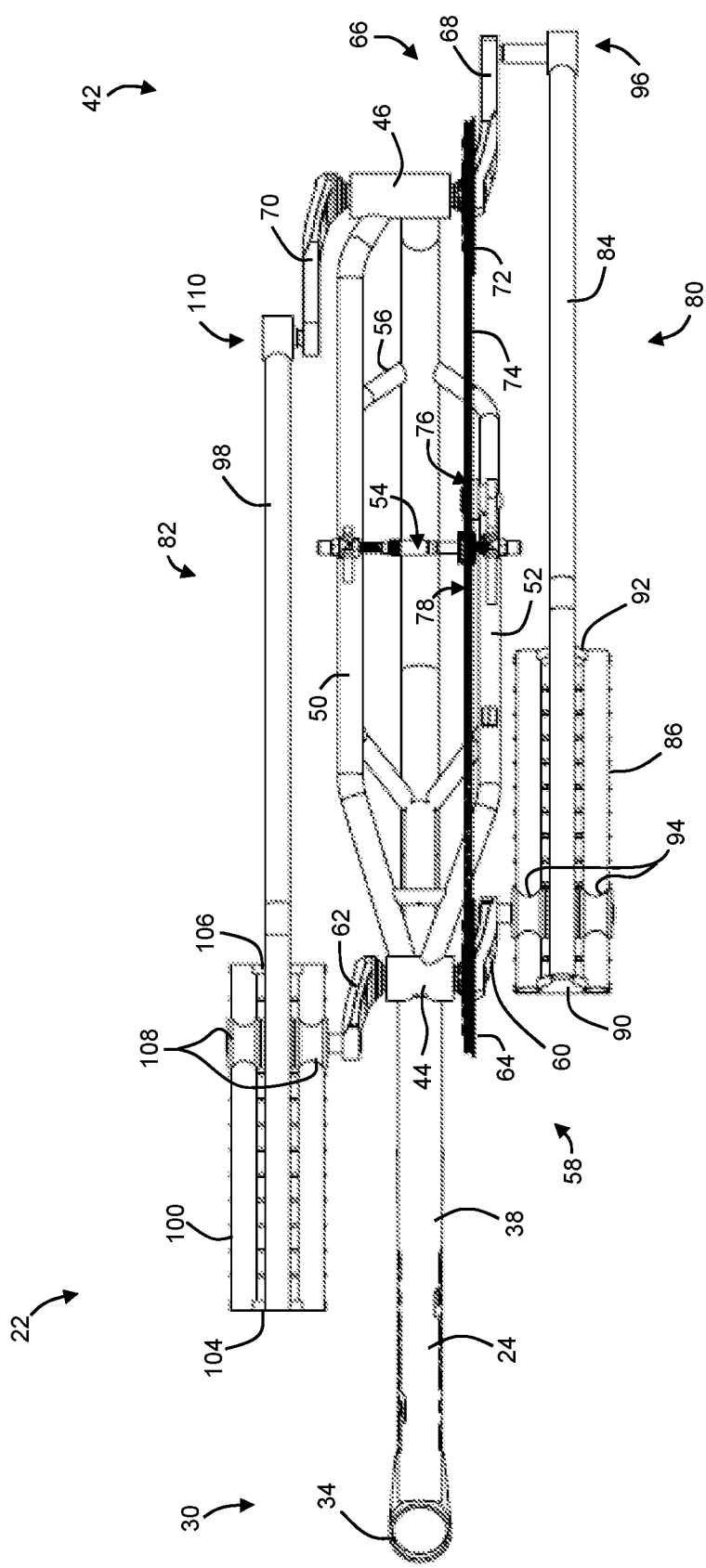
FIG. 8 is a bottom plan view of the frame and drive assembly shown in FIG. 4.
Figure 9:
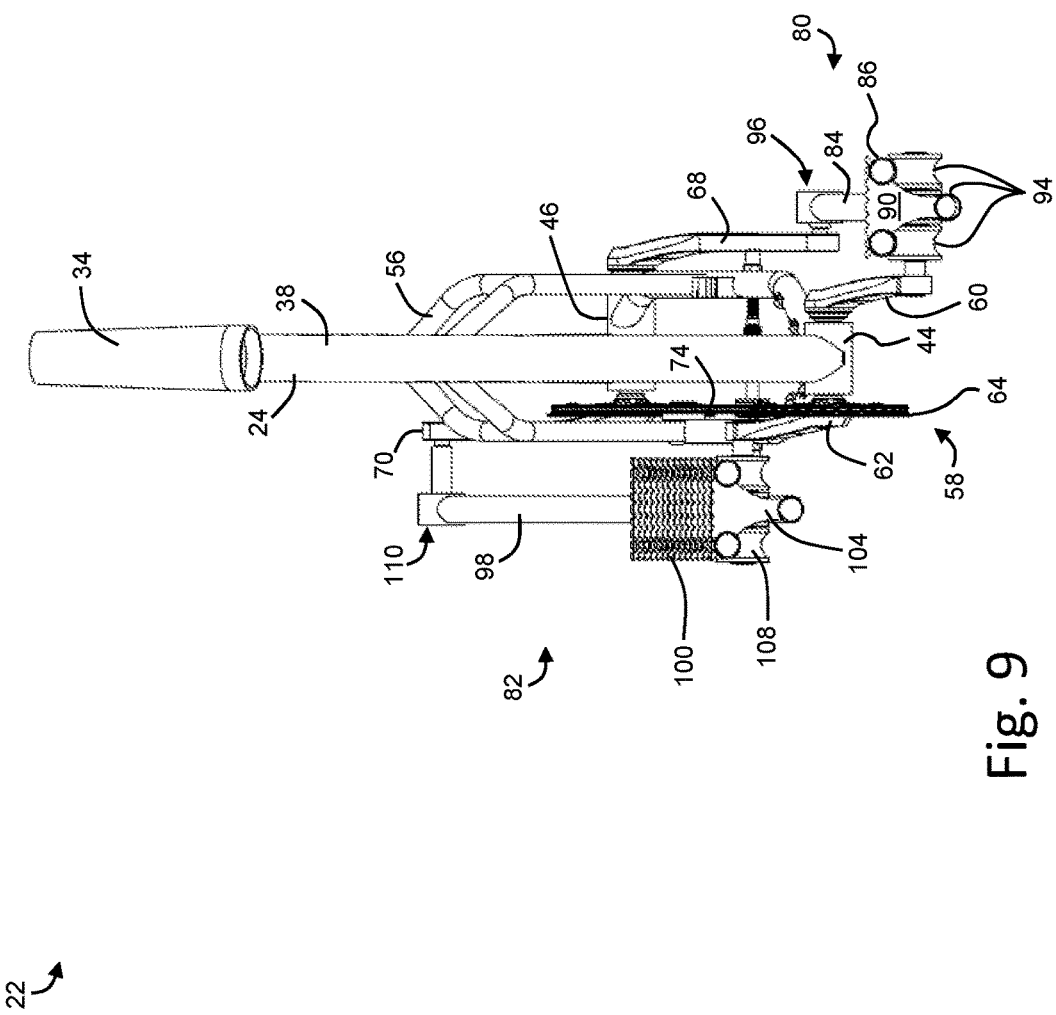
FIG. 9 is a front elevation view of the frame and drive assembly shown in FIG. 4.

One or more coaxial rollers 94 extend from the distal portion of left front crank arm 60. Each of these rollers has an axis of rotation that is orthogonal to the crank arm, such that left foot platform 80 can slide forward and backward, as well as rotate, on the rollers. As best shown in FIGS. 7-9, drive assembly 22 includes an axle having three rollers on each side, with a central roller engaging elongate member 84, and an inboard and outboard roller providing added support and stability for foot support 86.

Elongate member 84 angles upward from the foot support to meet a distal end portion of left rear crank arm 68 at a revolute (i.e., rotating) joint 96. Accordingly, left foot platform 80 is connected to a distal end portion of the left front crank arm by a pin-in-slot joint and to a distal end portion of the left rear crank arm by a rotating joint.

Similarly, right foot platform 82 includes an elongate member 98 and a right foot support 100 at a front end of member 98. Right foot support 100 is spaced from member 98 to create a slot or channel 102, also referred to as the right roller channel. Forward and aft spacer members 104, 106 space the foot support from the elongate member, and create a close-ended channel 102.

One or more coaxial rollers 108 extend from the distal portion of right front crank arm 62. Each of these rollers has an axis of rotation that is orthogonal to the crank arm, such that right foot platform 82 can slide forward and backward, as well as rotate, on the rollers. As explained above, drive assembly 22 includes an axle having three rollers on each side. Here, a central roller engages elongate member 98, and an inboard and outboard roller provide added support and stability for foot support 100.

Similar to elongate member 84, elongate member 98 angles upward from the foot support to meet a distal end portion of right rear crank arm 70 at a revolute (i.e., rotating) joint 110. Accordingly, right foot platform 82 is connected to a distal end portion of the right front crank arm by a pin-in-slot joint and to a distal end portion of the right rear crank arm by a rotating joint.

Referring now to FIGS. 2 and 3, each of the foot supports 86, 100 is sized and oriented to receive a respective left foot 112 or right foot 114 of the rider, such that the foot is placed on an upper tread surface of the foot support with toes pointed generally forward. As shown in FIG. 2, the foot may be flat on the foot support (e.g., with weight on the rear or heel portion of the foot) when the front crank is in a lower position. As shown in FIG. 3, when the crank is in a higher position, a rear portion of the foot may be lifted from the tread surface.

Figure 10:
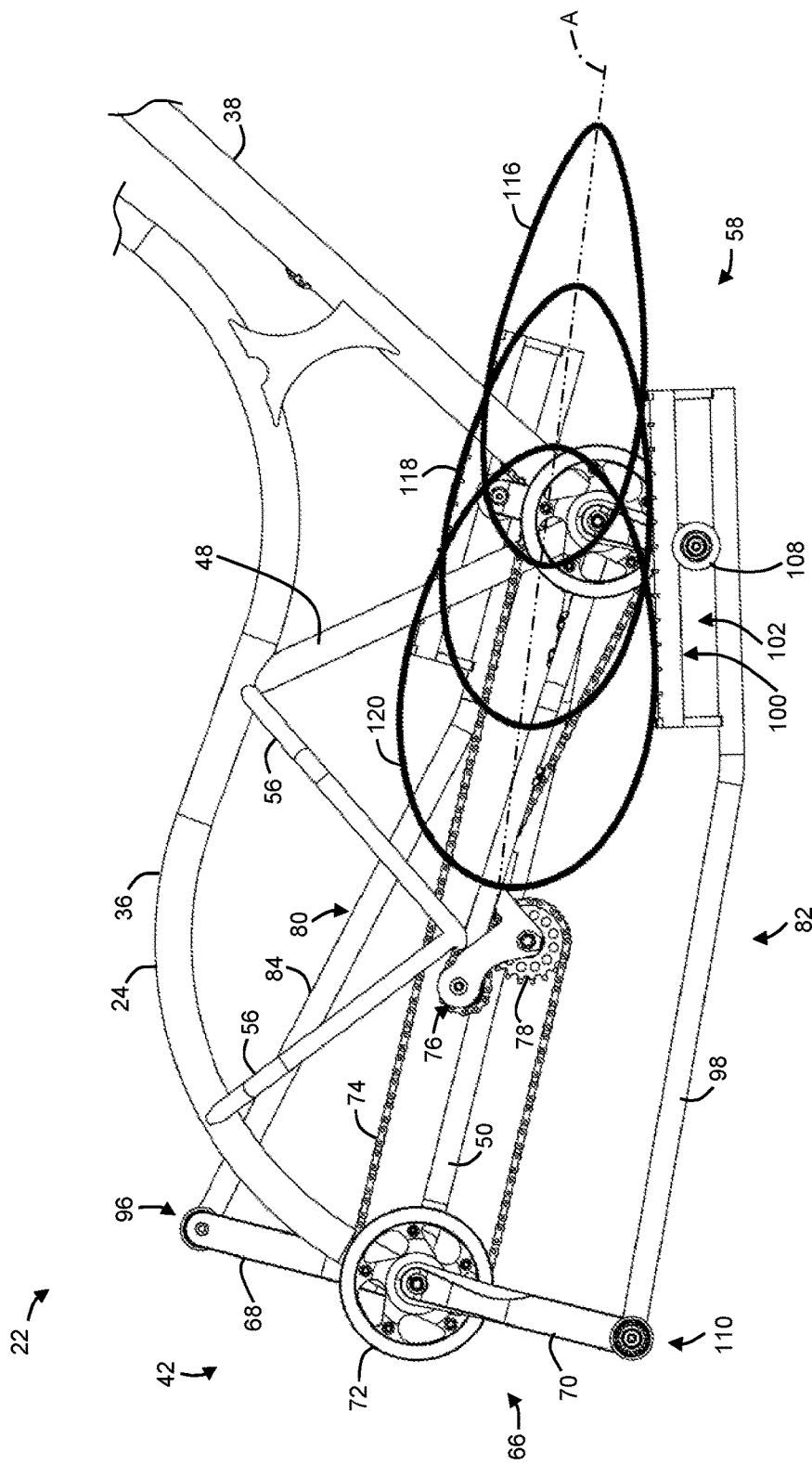
FIG. 10 is a side elevation view of the frame and drive assembly of FIG. 4, showing various operational pathways associated with foot platforms of the drive assembly.

Turning to FIG. 10, ovals are superimposed on a right-side view of drive assembly 22. These ovals represent traces of the spatial paths taken by three different parts of foot supports 86 and 100 when the foot platforms are operated to rotate the front and rear cranksets. These paths are shown as viewed from a vantage point orthogonal to a plane generally defined by the path, i.e., from the side of the drive assembly. A forward or toe path 116 traces the path taken by a front portion of the two foot supports. A middle or mid-foot path 118 traces the path taken by a middle portion of the two foot supports. A rear or heel path 120 traces the path taken by a rear portion of the two foot supports.

As shown in FIG. 10, each path has the same overall length and is symmetrical about a long axis A. Furthermore, each path forms a teardrop or oval shape having a larger rear portion and a smaller front portion. Additionally, due to the relative lengths of the crank arms, ovals closer to the front of the foot supports are narrower in a dimension perpendicular to axis A than are ovals closer to the rear of the foot supports. For example, heel path 120 is wider than toe path 116, and has an overall path length that is longer than toe path 116. Nevertheless, each portion of the foot support (and therefore each of paths 116, 118, 120) must complete a revolution at the same time as the rest. In other words, each of the paths shown is completed simultaneously. Accordingly, different parts of the rider's foot will experience different pathways and correspondingly different force mechanics with respect to the crank arms.

As the cranksets are rotated by the foot platforms, different portions of the foot support will be in contact with the rollers as the foot platform moves forward and backward on the rollers. Therefore, force is transmitted from the rider through the foot support of the foot platform at a different point on the foot support (and from a different part of the rider's foot), depending on the rotational position of the crank arm. Various positions of the crank arms, and corresponding different positions of the foot platforms, are shown, for example, in FIGS. 2, 3, and 6. It should be understood from these examples that the drive assembly is configured such that force will generally be applied from a rear portion of the rider's foot when the crank arm is level and forward. Additionally, the rollers will effectively move forward under the foot as the foot platform moves down and back. This arrangement simulates the heel strike, stride, and kick-back motion of a runner. Additionally, as shown in FIG. 3, the rollers will be in the vicinity of the toes on the upward rotation, facilitating the use of an optional toe clip 122 to pull upward on the foot platform, if desired.

The teardrop motion of the foot platforms can be generally described as a hybrid of cycling and running motions. Professional cyclists train to pull bicycle pedals in a full circle, expending energy tangential to the circular pedal path (i.e., perpendicular to the crank arm). However, most casual riders simply press downward, alternatingly applying force and/or body weight to the pedals. This latter form of riding results in an efficient transfer of energy through the crank arms only when the cranks are forward and parallel to the ground. On the other hand, runners tend to naturally land on a rear portion of their feet and then thrust rearward to propel themselves forward.

Combining these motions, landing on the feet becomes the downward force placed directly over the short forward crank arms when they are parallel to the ground. These short crank arms have a higher gain ratio (i.e., less leverage) than the longer rearward crank arms, which is appropriate to the high-load downward foot pressure. The runner then kicks rearward, and this higher speed/lower force motion is transferred over the front rollers to the longer rearward cranks which appropriately are moving at a higher speed with a lower gain ratio (i.e., higher leverage). Blending these two parts of the motion naturally creates an efficient transfer of energy over a longer part of the rider's stride.

In addition to transferring the rider's motion efficiently to the drive train, the movement of the rollers beneath the foot support, as described above, provides a safe and stable support to the rider. As the rider's leg extends forward, weight lands first upon the heel. The rollers at this point in the motion are also positioned under the rear of the foot platform. As the rider kicks rearward, weight is transferred to the toe. Again, the rollers at this point in the motion are now positioned under the front portion of the foot support. This synergistic movement of the drive assembly relative to rider-induced forces increases strength of the device while using less material weight.

Second Illustrative Drive Assembly and Vehicle

Figure 11:
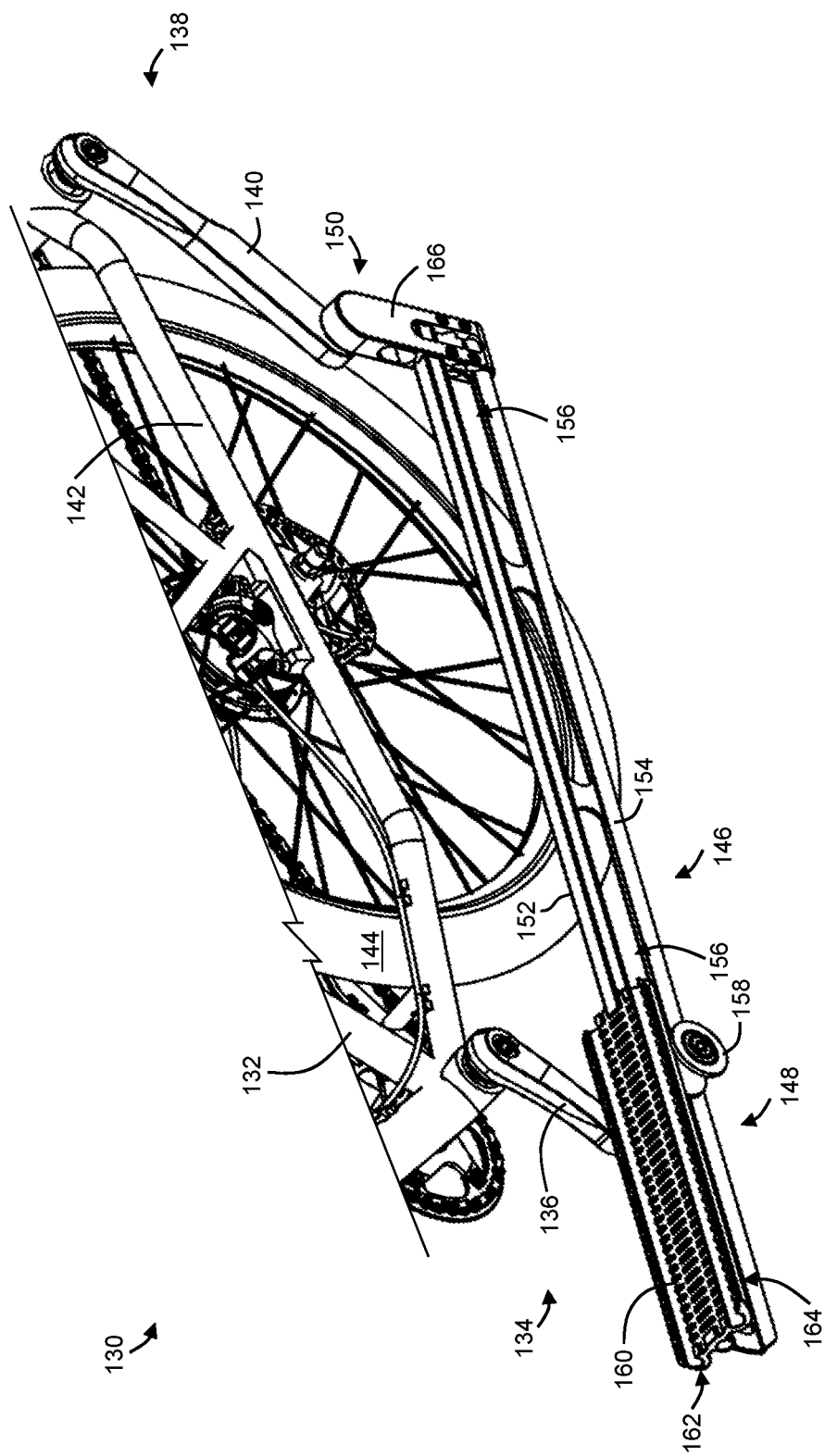
FIG. 11 is a partial oblique isometric view of another example of a drive assembly having a different foot platform in accordance with aspects of the present disclosure.

As shown in FIG. 11, this section describes another illustrative drive assembly 130 integrated with a vehicle 132 according to the present teachings. Drive assembly 130 and vehicle 132 are substantially similar to drive assembly 22 and vehicle 20, described above. Accordingly, drive assembly 130 includes a front crankset 134 having a front crank arm 136, and a rear crankset 138 having a longer rear crank arm 140, both cranksets being coupled to a frame 142 of vehicle 132 to drive a rear wheel 144.

A foot platform 146 is connected to a distal end portion of front crank arm 136 by a pin-in-slot joint 148 and to a distal end portion of rear crank arm 140 by a rotating joint 150.

However, unlike the foot platforms of drive assembly 22, foot platform 146 comprises an extruded (e.g., aluminum) structure having an upper elongate member 152 and a parallel lower elongate member 154 separated by gussets or web portions that create multiple closed slots 156 between the two elongate members. An axle extending laterally from front crank arm 136 passes through a front-end slot 156 and carries a pair of rollers 158. A foot support 160 extends across and along a front portion of upper member 152, such that side portions 162 and 164 of the foot support ride atop rollers 158.

In this example, the elongate members of foot platform 146 do not have an angled portion to bring the rear end of the foot platform to the distal end portion of the rear crank arm at joint 150. Instead, a right-angle offset portion 166 is affixed to the rear end of elongate members 152, 154, allowing the foot support and elongate members to remain substantially horizontal when in a downward position (as shown in FIG. 11).

Third Illustrative Drive Assembly and Vehicle

Figure 12:
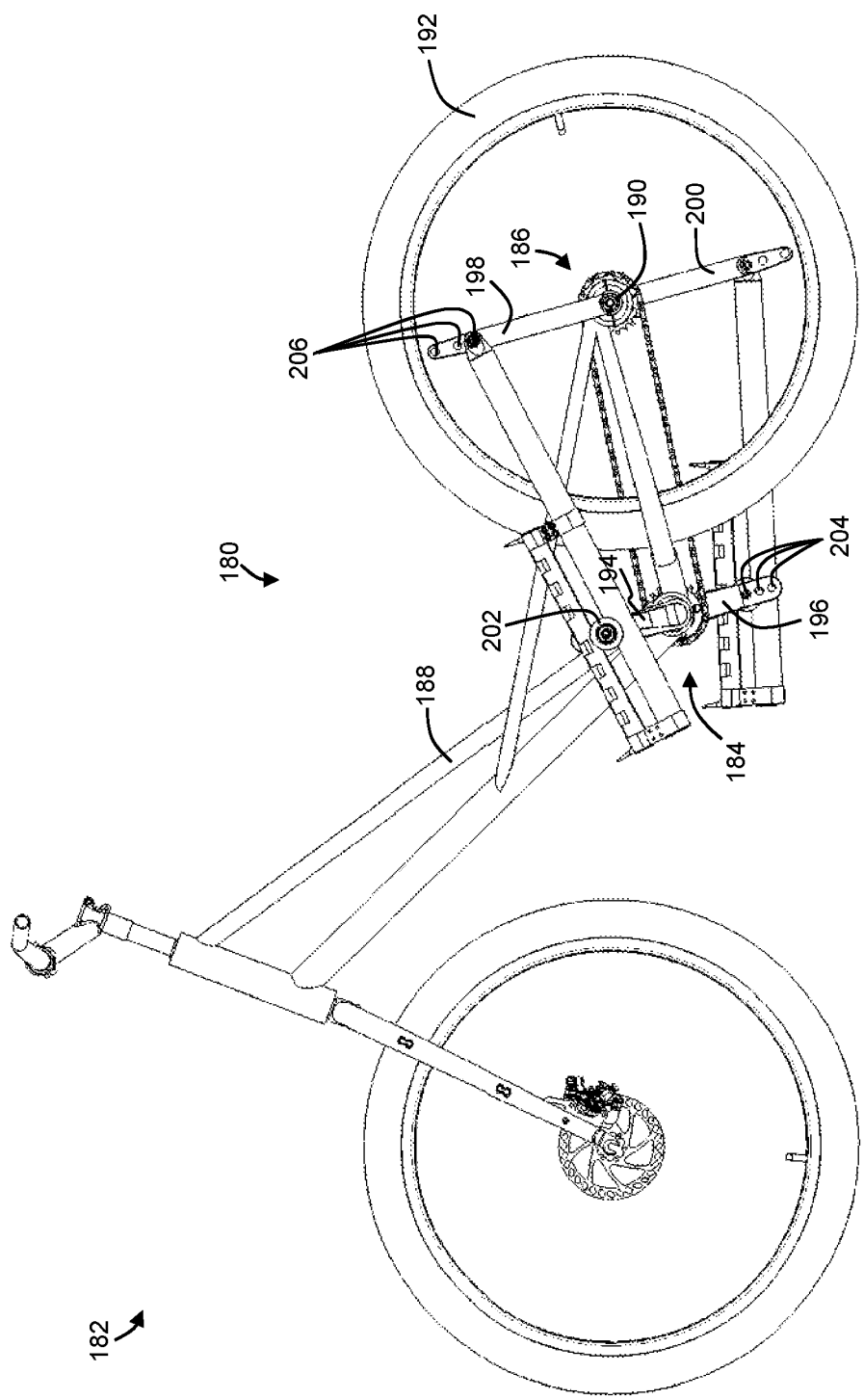
FIG. 12 is a left side elevation view of another illustrative human-powered vehicle having another example of a drive assembly in accordance with aspects of the present disclosure.

As shown in FIG. 12, this section describes another illustrative drive assembly 180 and associated vehicle 182.

Drive assembly 180 includes a front crankset 184 and a rear crankset 186 coupled to a frame 188 of vehicle 182 (a bicycle). Frame 188 differs from frame 24 of vehicle 20, above, in that the rear rotational connection of rear crankset 184 is coaxial with a hub 190 of a rear wheel 192 of the vehicle. Accordingly, frame 188 does not extend over wheel 192, but instead extends to hub 190 of the rear wheel.

In general, drive assembly 180 is substantially similar to drive assemblies 22 and 130. However, some differences include a shorter distance between the rotational axis of the front crankset and the rotational axis of the rear crankset. As mentioned above, drive assembly 22 has a front crankset axis disposed forward of the wheel hub and a rear crankset axis disposed rearward of the wheel hub. On the other hand, drive assembly 180 has a front crankset axis disposed forward of the wheel hub and a rear crankset that is substantially coaxial with the rear wheel.

As with other drive assemblies described herein, front crank arms 194 and 196 are shorter than rear crank arms 198 and 200, and the crank arms are connected by foot platforms having a rear rotational joint and a front pin-in-slot joint. However, in this embodiment, each of the crank arms has an adjustable length. For example, as shown in FIG. 12, the position of front rollers 202 can be adjusted between three discrete mounting points 204 on each of the front crank arms. Similarly, the position of the rear rotational joint between the foot platforms and the rear crank arms can be selected from one of three connection points 206. This gives an effective choice of nine length combinations between the three front and three rear adjustment choices. Each combination results in a unique path shape for the foot platform.

Illustrative Method

This section describes steps of an illustrative method 220 for powering a machine (e.g., a human-powered machine), such as a vehicle (e.g., a bicycle) or an exercise machine. See FIG. 13. Aspects of drive assemblies and vehicle described above may be utilized in the method steps described below. Where appropriate, reference may be made to components and systems that may be used in carrying out each step. These references are for illustration, and are not intended to limit the possible ways of carrying out any particular step of the method.

Figure 13:
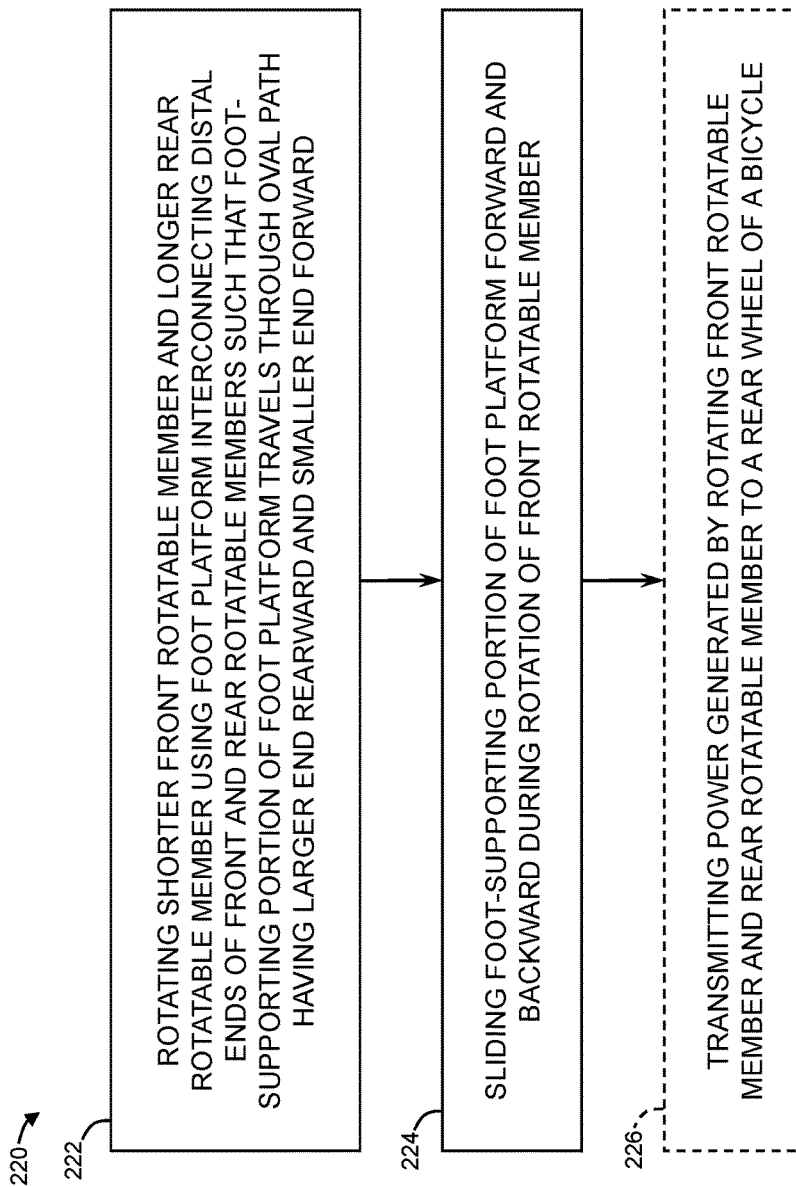
FIG. 13 is a flow chart depicting steps of an illustrative method for turning a human-powered wheel according to the present teachings.

FIG. 13 is a flowchart illustrating steps performed in an illustrative method, and may not recite the complete process or all steps of the method. FIG. 13 depicts multiple steps of the method, which may be performed in conjunction with drive assemblies according to aspects of the present disclosure. Although various steps of method 220 are described below and depicted in FIG. 13, the steps need not necessarily all be performed, and in some cases may be performed in a different order than the order shown.

Step 222 includes simultaneously rotating a front rotatable member (e.g., front crank arm 60) and a rear rotatable member (e.g., rear crank arm 68) using a foot platform (e.g., foot platform 80) interconnecting distal ends of the front and rear rotatable members, each of the rotatable members being coupled to a frame (e.g., frame 24) of a machine (e.g., vehicle 20). The front rotatable member may be substantially shorter than the rear rotatable member. A foot-supporting portion (e.g., foot support 86) of the foot platform travels through a path (e.g., paths 116, 118, 120) having the shape of an oval when viewed from a vantage point orthogonal to the path, the oval having a larger end rearward and a smaller end forward. In some examples, the front rotatable member is less than approximately half as long as the rear rotatable member. For example, the front rotatable member may comprise a front crank arm having a length of about 110 mm, and the rear rotatable member may comprise a rear crank arm having a length of about 230 mm. In some examples, a difference between the lengths of the front and rear crank arms is approximately four inches to approximately five inches.

Step 224 includes sliding the foot-supporting portion of the foot platform forward and backward during rotation of the front rotatable member. As described above, the foot platforms are connected to the distal end portion of their respective front crank arms by a pin-in-slot joint, such that the foot platform slides forward and backward in a predictable way as the cranks rotate. The distance each foot platform slides in each direction corresponds to twice the difference in lengths between the front and rear crank arms. In some embodiments, this sliding distance is selected to correspond to a major portion of a typical rider's foot (e.g., eight to ten inches).

In optional step 224, the machine comprises a bicycle (e.g., a mobile bike such as vehicle 20, or a stationary exercise bike). Step 224 includes transmitting power generated by simultaneously rotating the front rotatable member and the rear rotatable member to a rear wheel (e.g., rear wheel 40) of the bicycle.

In some examples, the method may include transmitting power from a pair of cranksets to a wheel, wherein a front crankset of the pair of cranksets includes a pair of front crank arms each having a first length and a rear crankset of the pair of cranksets includes a pair of rear crank arms each having a second length greater than the first length; wherein the front crankset is disposed a fixed distance forward of the rear crankset, and each one of the front crank arms is coupled to a corresponding one of the rear crank arms by a respective foot platform configured to receive a corresponding foot of a rider, wherein each foot platform is connected to a distal end portion of the respective front crank arm by a pin-in-slot joint and to a distal end portion of the respective rear crank arm by a rotating joint.

In some examples, the method may include receiving a force applied by the corresponding foot of the rider through each of the foot platforms onto a roller mounted to a distal end portion of the respective front crank arm. Receiving the force applied by the corresponding foot of the rider through each of the foot platforms may include receiving force through a longitudinally different portion of the foot platform as the front crank arm is rotated. Receiving the force applied by the corresponding foot of the rider through each of the foot platforms may include receiving force applied by a longitudinally different portion of the foot of the rider as the front crank arm is rotated.

Additional Examples and Illustrative Combinations

This section describes additional aspects and features of drive assemblies for human-powered machines, as well as related apparatuses and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A drive assembly for a human-powered machine, the drive assembly comprising:

a first crankset rotatably coupled to a frame, the first crankset including a pair of first crank arms each having a first length;

a second crankset rotatably coupled to the frame and spaced rearward from the first crankset, the second crankset including a pair of second crank arms each having a second length longer than the first length; and a left foot platform and a right foot platform, each of the foot platforms having a rear portion rotatably coupled to a distal end portion of a respective one of the second crank arms and a front portion in sliding and rotating engagement with a distal end portion of a respective one of the first crank arms;

wherein the first crankset and the second crankset are mechanically coupled to each other, such that the first and second cranksets turn together at a same number of revolutions per minute (RPM), and wherein the first and second cranksets are operatively connected to a hub of a wheel.

A1. The drive assembly of A0, wherein the first and second cranksets are mechanically coupled to each other by a bicycle chain.

A2. The drive assembly of any one of paragraphs A0 through A1, wherein the first and second cranksets are mechanically coupled to each other by a synchronous belt.

A3. The drive assembly of any one of paragraphs A0 through A2, wherein the first crankset includes a first chainring, the second crankset includes a second chainring, and the hub includes a sprocket, and a single bicycle chain passes around the first chainring, the second chainring, and the sprocket of the hub.

A4. The drive assembly of A3, wherein the single bicycle chain further passes around an idler pulley coupled to the frame.

A5. The drive assembly of A4, wherein the idler pulley comprises an eccentric idler pulley.

A6. The drive assembly of any one of paragraphs A0 through A5, wherein the first and second cranksets are operatively connected to the hub of the wheel by a direct connection between the second crankset and the hub.

A7. The drive assembly of any one of paragraphs A0 through A6, wherein the hub of the wheel comprises an internal-gear hub.

A8. The drive assembly of any one of paragraphs A0 through A7, wherein the first crankset has a first axis of rotation disposed forward of the wheel hub.

A9. The drive assembly of A8, wherein the second crankset and the wheel are substantially coaxial.

A10. The drive assembly of A8, wherein the second crankset comprises a second axis of rotation disposed rearward of the wheel hub.

A11. The drive assembly of A10, wherein the second axis is disposed rearward of the wheel.

A12. The drive assembly of any one of paragraphs A0 through A11, wherein the first crankset is rotatably coupled to the frame by a first bottom bracket.

A13. The drive assembly of A12, wherein the second crankset is rotatably coupled to the frame by a second bottom bracket.

A14. The drive assembly of any one of paragraphs A0 through A13, wherein the first length is less than approximately half of the second length.

A15. The drive assembly of A14, wherein the first length is approximately 110 mm and the second length is approximately 230 mm.

A16. The drive assembly of A14, wherein a difference between the first length and the second length is approximately four inches to approximately five inches.

A17. The drive assembly of any one of paragraphs A0 through A16, wherein the first crankset is spaced from the second crankset by approximately 23 inches.

A18. The drive assembly of any one of paragraphs A0 through A17, wherein each of the foot platforms includes a bearing surface in sliding and rotating engagement with one or more rollers extending from the distal end portion of the respective one of the first crank arms.

A19. The drive assembly of A18, wherein the bearing surface is disposed in a closed slot formed in the front portion of the foot platform.

A20. The drive assembly of A19, wherein each of the foot platforms further comprises a toe clip.

A21. The drive assembly of any one of paragraphs A0 through A20, each of the first crank arms comprising a roller coupled to the distal end portion of the respective first crank arm, wherein an axis of rotation of the roller is substantially parallel to an axis of rotation of the first crankset.

A22. The drive assembly of any one of paragraphs A0 through A21, wherein the wheel is a drive wheel of a human-powered vehicle, and the drive assembly is configured to propel the human-powered vehicle by transmitting power from a human to the drive wheel.

A23. The drive assembly of A22, wherein the human-powered vehicle is a bicycle, and the wheel is a rear wheel of the bicycle.

A24. The drive assembly of any one of paragraphs A0 through A23, wherein the wheel is a flywheel of a stationary exercise device, and the drive assembly is configured to spin the flywheel.

A25. The drive assembly of any one of paragraphs A0 through A24, wherein the distal ends of the second crank arms each include a plurality of attachment points, such that the second length is discretely adjustable.

B0. A method for turning a foot-powered wheel, the method comprising:

transmitting power from a pair of cranksets to a wheel, wherein a front crankset of the pair of cranksets includes a pair of front crank arms each having a first length and a rear crankset of the pair of cranksets includes a pair of rear crank arms each having a second length greater than the first length;

wherein the front crankset is disposed a fixed distance forward of the rear crankset, and each one of the front crank arms is coupled to a corresponding one of the rear crank arms by a respective foot platform configured to receive a corresponding foot of a rider, wherein each foot platform is connected to a distal end portion of the respective front crank arm by a pin-in-slot joint and to a distal end portion of the respective rear crank arm by a rotating joint.

B1. The method of B0, further comprising forcing the pair of cranksets to turn together at a same revolutions per minute by passing a single bicycle chain around a front chainring of the front crankset and around a rear chainring of the rear crankset.

B2. The method of any one of paragraphs B0 through B1, wherein one or more of the cranksets is rotatably coupled to a bicycle frame.

B3. The method of B2, wherein the one or more of the cranksets is mounted to the bicycle frame by a respective bottom bracket.

B4. The method of any one of paragraphs B0 through B3, further comprising receiving a force applied by the corresponding foot of the rider through each of the foot platforms onto a roller mounted to a distal end portion of the respective front crank arm.

B5. The method of B4, wherein receiving the force applied by the corresponding foot of the rider through each of the foot platforms includes receiving force through a longitudinally different portion of the foot platform as the front crank arm is rotated.

B6. The method of B5, wherein receiving the force applied by the corresponding foot of the rider through each of the foot platforms includes receiving force applied by a longitudinally different portion of the foot of the rider as the front crank arm is rotated.

B7. The method of any one of paragraphs B0 through B6, wherein transmitting power from the pair of cranksets to the wheel includes coupling the pair of cranksets to a hub of the wheel using a bicycle chain.

B8. The method of B7, further comprising tensioning the bicycle chain using an eccentric idler pulley.

B9. The method of any one of paragraphs B0 through B8, wherein transmitting power from the pair of cranksets to the wheel includes directly connecting one of the cranksets to an axle of the wheel.

B10. The method of any one of paragraphs B0 through B9, wherein the front crankset comprises a circular front chainring and the rear crankset comprises a circular rear chainring.

B11. The method of any one of paragraphs B0 through B9, wherein at least one of the two cranksets includes a non-circular (e.g., elliptical) chainring.

C0. A drive assembly for turning a human-powered wheel, the drive assembly comprising:

a front crankset coupled to a rear crankset by a mechanical linkage, such that the front and rear cranksets turn together at a same revolutions-per-minute, wherein the front crankset includes a left front and a right front crank arm each having a first length and the rear crankset includes a left rear and a right rear crank arm each having a second length greater than the first length;

a left foot platform connecting the left front crank arm to the left rear crank arm, a front portion of the left foot platform coupled to a distal end portion of the left front crank arm by a first pin-in-slot joint, and a rear portion of the left foot platform coupled to a distal end portion of the left rear crank arm by a first rotating joint;

a right foot platform connecting the right front crank arm to the right rear crank arm, a front portion of the right foot platform coupled to a distal end portion of the right front crank arm by a second pin-in-slot joint, and a rear portion of the right foot platform coupled to a distal end portion of the right rear crank arm using a second rotating joint; and a wheel having a hub coupled to the front crankset such that power generated by the front and rear cranksets is transmitted to the wheel.

C1. The drive assembly of C0, wherein the mechanical linkage comprises a flexible linkage coupling a front chainring of the front crankset to a rear chainring of the rear crankset.

C2. The drive assembly of C1, wherein the flexible linkage comprises a bicycle chain.

C3. The drive assembly of C1, wherein the flexible linkage comprises a synchronous belt.

C4. The drive assembly of any one of paragraphs C0 through C3, wherein the mechanical linkage couples the front crankset, the rear crankset, and the hub of the wheel.

C5. The drive assembly of any one of paragraphs C0 through C4, wherein the front and rear cranksets are operatively connected to the hub of the wheel by a direct connection between the rear crankset and the hub.

C6. The drive assembly of any one of paragraphs C0 through C5, wherein the hub of the wheel comprises an internal-gear hub.

C7. The drive assembly of any one of paragraphs C0 through C6, wherein the front crankset has a first axis of rotation disposed forward of the wheel hub.

C8. The drive assembly of C7, wherein the rear crankset and the wheel are substantially coaxial.

C9. The drive assembly of C7, wherein the rear crankset comprises a second axis of rotation disposed rearward of the wheel hub.

C10. The drive assembly of C9, wherein the second axis is disposed rearward of the wheel.

C11. The drive assembly of any one of paragraphs C0 through C10, wherein the first length is less than approximately half of the second length.

C12. The drive assembly of C11, wherein the first length is approximately 110 mm and the second length is approximately 230 mm.

C13. The drive assembly of C11, wherein a difference between the first length and the second length is approximately four inches to approximately five inches.

C14. The drive assembly of any one of paragraphs C0 through C13, wherein the front crankset is spaced from the rear crankset by approximately 23 inches.

C15. The drive assembly of any one of paragraphs C0 through C14, wherein each of the first and second pin-in-slot joints includes a bearing surface in sliding and rotating engagement with one or more rollers extending from a distal end portion of a respective one of the front crank arms.

C16. The drive assembly of C15, wherein the bearing surface is disposed in a closed slot formed in the front portion of the corresponding foot platform.

C17. The drive assembly of any one of paragraphs C0 through C16, wherein the wheel is a drive wheel of a human-powered vehicle, and the drive assembly is configured to propel the human-powered vehicle by transmitting power from a human to the drive wheel.

C18. The drive assembly of C17, wherein the human-powered vehicle is a bicycle, and the wheel is a rear wheel of the bicycle.

C19. The drive assembly of C18, wherein the rear wheel of the bicycle is at least approximately 24 inches in diameter.

C20. The drive assembly of any one of paragraphs C0 through C19, wherein the wheel is a flywheel of a stationary exercise device, and the drive assembly is configured to spin the flywheel.

D0. A method for powering a machine, the method comprising:

simultaneously rotating a front rotatable member and a rear rotatable member using a foot platform interconnecting distal ends of the front and rear rotatable members, each of the rotatable members being coupled to a frame of a foot-powered machine; and transmitting power generated by simultaneously rotating the front rotatable member and the rear rotatable member to a wheel of the machine;

wherein the front rotatable member is substantially shorter than the rear rotatable member, and a foot-supporting portion of the foot platform travels through a path having the shape of an oval when viewed orthogonally to a plane generally defined by the path, the oval having a larger end rearward and a smaller end forward.

D1. The method of D0, further comprising:

sliding the foot-supporting portion of the foot platform forward and backward during rotation of the front rotatable member.

D2. The method of any one of paragraphs D0 through D1, wherein the front rotatable member is less than approximately half as long as the rear rotatable member.

D3. The method of any one of paragraphs D0 through D2, wherein the machine is a bicycle and the wheel is a rear wheel of the bicycle.

D4. The method of D3, wherein the rear wheel has an outer diameter of at least approximately 24 inches.

Advantages, Features, Benefits

The different embodiments and examples of the drive assemblies and related methods described herein provide several advantages over known solutions. Several advantages are described throughout the disclosure, and additional advantages are listed below. For example, for illustrative embodiments and examples described herein, in addition to providing a load-bearing, low-impact, natural, fluid experience to the rider, there are increased biomechanical efficiencies for most riders. This increased biomechanical efficiency is the result, at least in part, of blending the cycling motion with running and eliminating the seat.

Additionally, and among other benefits, illustrative embodiments and examples described herein do not require the static tracks found on known elliptical drives, such that frames according to the present teachings may be manufactured using traditional bicycle frame manufacturing methods.

Additionally, and among other benefits, illustrative embodiments and examples described herein permit the inclusion of a wider range of wheel sizes, including full-sized bicycle wheels (e.g., 24 to 26 inches, as measured at the outer diameter when the tire is installed and inflated) and other bicycle-like benefits, as described below.

Typical elliptical-drive machines have long static tracks that extend beyond the foot path (both forward and below the foot path), requiring machines to accommodate these tracks. This results, for example, in known indoor elliptical exercise machines that are generally over six feet long. Known elliptical-drive bicycles are forced to use small tires (typically 20-inches), yet they still have a wheelbase exceeding the capacity of most bicycle carriers. Furthermore, known elliptical-drive bicycles have as little as four inches of ground clearance, while still placing the rider several inches higher off the ground than a traditional bicycle. This can be cumbersome, and makes mounting and dismounting difficult.

Embodiments according to the present disclosure have analogous "tracks" (e.g., channels 88, 102) that do not extend beyond the front of the foot path. Additionally, these dynamic tracks rise and fall similar to the pedals of a bicycle. This results in an indoor exercise machine embodiment that can operate in less than five feet of space. An outdoor embodiment can use full-sized tires with a wheelbase that most bicycle riders are used to and which most bicycle carriers can accommodate. A rider may ride at the same distance from the ground experienced on a bicycle (with similar ground clearance), making the ride safer and more comfortable, while making mounting and dismounting easier. Additionally, vehicles according to the present teachings can be ridden off-road and on trails.

Additionally, and among other benefits, illustrative embodiments and examples described herein include shorter guide channels which can ride above the rollers. This is different from known devices, where guides are anchored to the frame-supporting rollers. The arrangement disclosed herein may help to isolate the frame from resonant noise, shed debris instead of collecting it, and can be more easily and cost effectively replaced/refurbished when needed.

Additionally, and among other benefits, illustrative embodiments and examples described herein can include stationary exercise machines that have a variable-height front end and/or rear end, such that the overall inclination may be changed (i.e., by changing the relative heights of the front and rear BBs).

Additionally, and among other benefits, illustrative embodiments and examples described herein have no seat, such that the legs of a rider in an upright posture are more naturally extended, creating greater comfort, less knee strain, and higher efficiency. This is an advantage over the common practice of seats that are adjusted too low, e.g., to make mounting and dismounting a bicycle easier. The low seat height further reduces cycling efficiency and places greater strain upon the knees.

No known system or device includes the benefits described here and elsewhere in the specification. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A drive assembly for a human-powered machine, the drive assembly comprising:
   a first crankset rotatably coupled to a frame supporting a wheel, the first crankset having a first axis of rotation disposed forward of a hub of the wheel and including a pair of first crank arms each having a first length;
   a second crankset rotatably coupled to the frame and having a second axis of rotation spaced rearward from the first crankset, the second crankset including a pair of second crank arms each having a second length at least twice as long as the first length; and
   a left foot platform and a right foot platform, each of the foot platforms having a rear portion rotatably coupled to a distal end portion of a respective one of the second crank arms and a front portion in sliding and rotating engagement with a distal end portion of a respective one of the first crank arms;
   wherein the first crankset and the second crankset are mechanically coupled to each other, such that the first and second cranksets turn together at a same revolutions per minute, and wherein the first and second cranksets are operatively connected to the hub of the wheel.

2. The drive assembly of claim 1, wherein the first and second cranksets are mechanically coupled to each other by a bicycle chain.

3. The drive assembly of claim 2, wherein the first crankset includes a first chainring, the second crankset includes a second chainring, and the hub includes a sprocket, and the bicycle chain is a single bicycle chain passing around the first chainring, the second chainring, and the sprocket of the hub.

4. The drive assembly of claim 1, wherein the second crankset and the wheel are coaxial.

5. The drive assembly of claim 1, wherein the second crankset comprises a second axis of rotation disposed rearward of the wheel hub.

6. The drive assembly of claim 1, wherein a difference between the first length and the second length is four inches to five inches.

7. The drive assembly of claim 1, wherein each of the foot platforms is in sliding and rotating engagement with one or more rollers extending from the distal end portion of the respective one of the first crank arms.

8. The drive assembly of claim 7, wherein the one or more rollers are disposed in a closed slot formed in the front portion of the foot platform.

9. The drive assembly of claim 1, wherein:
   the first crankset is coupled to the second crankset by a mechanical linkage the front portion of the left foot platform is coupled to the distal end portion of the left first crank arm by a first pin-in-slot joint, and the rear portion of the left foot platform is coupled to the distal end portion of the left second crank arm by a first rotating joint;
   the front portion of the right foot platform is coupled to the distal end portion of the right first crank arm by a second pin-in-slot joint, and the rear portion of the right foot platform is coupled to the distal end portion of the right second crank arm by a second rotating joint; and
   the wheel hub is coupled to the first crankset such that power generated by the first and second cranksets is transmitted to the wheel.

10. The drive assembly of claim 9, wherein the mechanical linkage comprises a synchronous belt.

11. The drive assembly of claim 9, wherein the mechanical linkage couples the first crankset, the second crankset, and the hub of the wheel.

12. The drive assembly of claim 9, wherein the second crankset and the wheel are coaxial.

13. The drive assembly of claim 9, wherein each of the first and second pin-in-slot joints includes a closed slot in sliding and rotating engagement with one or more rollers extending from a distal end portion of a respective one of the first crank arms.

14. The drive assembly of claim 1, wherein the first axis of rotation is disposed forward of the hub of the wheel by a first distance, and the second axis of rotation is disposed rearward of the first axis of rotation by at least the first distance.

15. The drive assembly of claim 1, wherein a height of the hub of the rear wheel is greater than a first height of the first axis of rotation.

16. The drive assembly of claim 15, wherein the height of the hub of the rear wheel is less than or equal to a second height of the second axis of rotation.

17. A drive assembly for a human-powered machine, the drive assembly comprising:
   a first crankset rotatably coupled to a frame supporting a wheel, the first crankset having a first axis of rotation disposed forward of a hub of the wheel and including a pair of first crank arms each having a first length;
   a second crankset rotatably coupled to the frame and having a second axis of rotation spaced rearward from the first crankset, the second crankset including a pair of second crank arms each having a second length longer than the first length; and
   a left foot platform and a right foot platform, each of the foot platforms having a rear portion rotatably coupled to a distal end portion of a respective one of the second crank arms and a front portion in sliding and rotating engagement with a distal end portion of a respective one of the first crank arms;
   wherein the first crankset and the second crankset are mechanically coupled to each other, such that the first and second cranksets turn together at a same revolutions per minute, and wherein the first and second cranksets are operatively connected to the hub of the wheel;
   wherein a height of the hub of the rear wheel is greater than a first height of the first axis of rotation; and
   wherein the first axis of rotation is disposed forward of the hub of the wheel by a first distance, and the second axis of rotation is disposed rearward of the first axis of rotation by at least the first distance.

18. The drive assembly of claim 17, wherein the height of the hub of the rear wheel is less than a second height of the second axis of rotation.

19. The drive assembly of claim 17, wherein the second length of the second crank arms is at least twice as long as the first length of the first crank arms.

20. The drive assembly of claim 17, wherein the second crankset and the wheel are coaxial.

21. The drive assembly of claim 17, wherein the second axis of rotation is disposed rearward of the wheel hub.

22. A drive assembly for a human-powered machine, the drive assembly comprising:
   a first crankset rotatably coupled to a frame supporting a wheel, the first crankset having a first axis of rotation disposed forward of a hub of the wheel and including a pair of first crank arms each having a first length;

a second crankset rotatably coupled to the frame and having a second axis of rotation spaced rearward from the first crankset, the second crankset including a pair of second crank arms each having a second length longer than the first length; and a left foot platform and a right foot platform, each of the foot platforms having a rear portion rotatably coupled to a distal end portion of a respective one of the second crank arms and a front portion in sliding and rotating engagement with a distal end portion of a respective one of the first crank arms;

wherein the first crankset and the second crankset are mechanically coupled to each other, such that the first and second cranksets turn together at a same revolutions per minute, and wherein the first and second cranksets are operatively connected to the hub of the wheel; and wherein a height of the hub of the rear wheel is greater than a first height of the first axis of rotation and less than a second height of the second axis of rotation.

* * * * *